United States Patent [19]

Suggs et al.

[11] 4,229,480
[45] Oct. 21, 1980

[54] EMULSIFIERS FOR BAKED GOODS

[75] Inventors: James L. Suggs, Greeneville; Dan F. Buck, Kingsport, both of Tenn.

[73] Assignee: Eastman Kodak Company, Rochester, N.Y.

[21] Appl. No.: 974,286

[22] Filed: Dec. 29, 1978

Related U.S. Application Data

[63] Continuation-in-part of Ser. No. 889,474, Mar. 28, 1978, abandoned.

[51] Int. Cl.$^2$ ............................................. A21D 2/16
[52] U.S. Cl. ................................ 426/24; 426/549;
426/653; 426/654
[58] Field of Search ............... 426/24, 25, 653, 654, 426/549; 252/356

[56] References Cited

U.S. PATENT DOCUMENTS

| | | | |
|---|---|---|---|
| 3,034,898 | 5/1962 | Kuhrt et al. | 426/653 X |
| 3,248,229 | 4/1966 | Pader et al. | 426/653 X |
| 3,369,907 | 2/1968 | Knightly | 426/549 X |
| 3,370,958 | 2/1968 | Freund | 426/653 X |
| 3,388,999 | 6/1968 | Kuhrt et al. | 426/653 X |
| 3,806,604 | 4/1974 | Kozak | 426/24 X |
| 3,876,805 | 4/1975 | Craig et al. | 426/653 X |

*Primary Examiner*—Esther M. Kepplinger
*Attorney, Agent, or Firm*—John F. Stevens; Daniel B. Reece, III

[57] ABSTRACT

Disclosed are dry powdered emulsifiers suitable for use in dough from which bakery products are made. The powdered emulsifiers are solid solutions comprising (1) saturated monoesters, or mixtures of saturated monoesters and succinylated monoglycerides and (2) unsaturated monoesters. The monoesters are prepared from fatty acids and either glycerine or propylene glycol, and are saturated to an extent so as to have an iodine value within the range of about 5 to about 33, and a melting point of at least about 50° C. The powder has sufficient wettability to form a particulate dispersion in water at 25° C. under mild agitation.

16 Claims, No Drawings

EMULSIFIERS FOR BAKED GOODS

BACKGROUND OF THE INVENTION

1. Field of the Invention

This invention relates generally to bakery products, and more specifically this invention relates to dry powdered emulsifiers useful in the dough from which bakery products are made which enhance physical characteristics such as dough strength and/or crumb softness. The emulsifiers are particularly useful because they are powdered and are dispersible without the use of dispersing aids.

2. Description of the Prior Art

It is known to use additives in connection with the baking of various goods to provide improvement in the structural characteristics of the baked goods, such as grain, texture, softness and volume. Also, some additives improve the handling characteristics or machineability of the dough prepared for the baked goods. Such additives usually depend on the addition of an inert diluent or carrier for dispersibility. For example, saturated monoglycerides will emulsify fats and water and are widely used as crumb softeners in the baking industry. Compounds such as saturated succinylated monoglycerides are used as strengtheners, sometimes in combination with the crumb softeners. Saturated monoesters, however, are naturally repelled by water. Although these saturated monoesters can be powdered, they must be hydrated or mixed with low melting inert carriers (e.g., a fat) before they can be dispersed in dough. Hydration is normally by using a high-energy process to disperse very fine particles (e.g., about 1-10 microns) in water. The use of such inert carriers is undersirable for several obvious reasons. Handling of the potent, concentrated emulsifier is preferred to handling the diluted emulsifier. Also, flavor is often affected by carriers. In accordance with the present invention, the powdered emulsifier is readily dispersible in bread dough without the use of a carrier. It is very advantageous to be able to use the emulsifier in the dough rather than the sponge or brew, because a master batch of sponge or brew can be made up for use with different doughs required for different bakery products.

Conventional highly unsaturated monoglycerides, on the other hand, are soft, greasy, insoluble in water, and form a gel in water at room temperature. Thus, neither saturated nor conventional unsaturated monoglycerides has filled the need in the industry for a powdered, dispersible monoglyceride which is made up essentially entirely of active ingredients.

It is indeed surprising to find that certain mixtures of saturated and conventional unsaturated monoesters, or monoesters having a degree of unsaturation within a certain range (generally unsaturated monoesters which have been saturated to a certain iodine value) overcome the disadvantage of the prior art because they are essentially entirely active, powderable, free-flowing and dispersible.

Patents of interest in this field include U.S. Pat. No. 3,370,958 which deals with succinylated monoglyceride and its use in combination with other food emulsifiers in the presence of fats or oils used in baking. This patent suggest slurrying the succinylated monoglyceride in water in the presence of a coemulsifier. U.S. Pat. Nos. 3,379,535 and 3,592,660 deal with conditioners for bread dough comprising monoglycerides and water. U.S. Pat. No. 3,494,771 relates to adding to emulsifiers a dispersion consisting essentially of (1) a conjointly solidified mixture of propylene glycol monostearate and a monoglyceride, (2) stearyl lactylic acid, and (3) water. This patent discloses that the components may be melted together to form a molten blend, which is then spray chilled to form a beadlet product.

U.S. Pat. No. 3,443,965 deals with an emulsifier which contains not more than 60% of monoglycerides derived from a saturated fatty acid and monoglycerides derived from an unsaturated fatty acid. The remainder of the product is diacetyl tartaric acid ester of mono- and diglycerides derived from unsaturated edible vegetable oil. The product is described as a plastic of the consistency of hydrogenated vegetable oil, shortening or lard which is, of course, quite different from this invention. Also of interest is the article "The Staling of Bread—A Review" in the October, 1977, issue of "The Bakers Digest" published by the Siebel Publishing Company, Pontiac, Ill.

At present, commercially available emulsifiers include Myvatex 8-20 and 8-20E distilled monoglycerides with 20% by weight hydrogenated vegetable oil, products of Eastman Chemical Products, Inc. Although these products include both saturated and unsaturated monoglycerides, they exist in a dispersed state in 20% by weight hydrogenated vegetable oil or fat. Such a blend would be unsuitable for use in dough because the hydrated vegetable oil is high melting and prevents hydration of the monoglycerides by acting as a water barrier.

U.S. Pat. No. 3,369,907 relates to the use of a blend of a low iodine value monoglyceride and a lower monocarboxylic acid ester of a polyhydric alcohol in the preparation of yeast-raised baked products. The blend is in the form of a soft pasta or plastic. U.S. Pat. No. 3,388,999 relates to the use of a mixture of a saturated monoglyceride, an unsaturated monoglyceride, water, lecithin, and a triglyceride in bakery products. In contrast, the present invention provides an additive which is in the form of a powder.

The art mentioned above exemplifies the extent to which others have gone to in the past to provide monoglyceride emulsifiers which are easy to use and dispersible.

SUMMARY OF THE INVENTION

The present invention provides dry, powdered emulsifiers which can be incorporated directly into dough used for bakery products such as bread, buns, pastries and other yeast raised baked goods without first being dispersed in a carrier.

In accordance with this invention, monoesters, unsaturated to the extent of having an iodine valve of between about 5 and about 33 and a melting point of above about 50° C., are found to form a dry, free-flowing powder and be sufficiently wettable to form a particulate dispersion in water at 25° C. Normally, to prepare the monoesters, a solid solution of (1) saturated monoesters, or mixture of saturated monoesters and succinylated monoglycerides and (2) unsaturated monoesters is prepared and used as a powdered emulsifier. The unsaturated monoesters are prepared from glycerine and/or propylene glycol and fatty acids which are usually obtained from edible vegetable oil or animal fat containing unsaturated or partially hydrogenated fatty acids as further described herein. The saturated monoesters are prepared from glycerine and/or propylene glycol and fatty acids which are usually obtained from edible vegetable oil and/or animal fat containing saturated fatty acids as further described herein. This solid solution is useful in enhancing the physical properties of bakery products, and is normally mixed in the dough or sponge.

DETAILED DESCRIPTION OF THE INVENTION

The solid solution in accordance with this invention consists essentially of mixtures of saturated monoesters and unsaturated monoesters, or mixtures of saturated monoesters, unsaturated monoesters and succinylated monoglycerides, such solid solution being a powder and having an iodine value of between about 5 and about 33, a melting point of at least about 50° C., and a wettability value of between 0 and about 65 (angle as specified herein), preferably between 0 and about 50. The esters will normally be mixtures resulting from use of oils and fats containing mixtures of acids. The saturated monoesters are represented by the formula $$\begin{array}{ll} CH_2OCOR_1 & \\ CHOH & \text{I.} \\ CH_2R_2 & \end{array}$$

wherein $R_1$ is the residue of a straight chain saturated fatty acid having from 8 to 22 carbon atoms and $R_2$ is OH or H.

The unsaturated monoesters are represented by the formula $$\begin{array}{ll} CH_2OCOR_3 & \\ CHOH & \text{II.} \\ CH_2R_4 & \end{array}$$

wherein $R_3$ is the residue of a straight chain unsaturated fatty acid having from 8 to 22 carbon atoms and $R_4$ is OH or H.

The succinylated monoglycerides are represented by the formula $$\begin{array}{ll} CH_2OCOR_5 & \\ CHOH & \text{III.} \\ CH_2OCOCH_2CH_2COOH & \end{array}$$

wherein $R_5$ is the residue of a straight chain saturated fatty acid having from 8 to 22 carbon atoms.

When the composition is a solid solution of Compounds I and II, the content of Compound I is 25-65%, preferably about 50% by weight of the total weight of the solid solution and the content of Compound II is 75-35%, preferably about 50% by weight of the total weight of the solid solution. When the solid solution contains Compound III, then the contents by weight of Compounds I, II and III are as follows: Compound I, 35-75%, preferably about 50%, Compound II, 65-10%, preferably about 25% and Compound III, up to about 65%, preferably about 25%.

The solid solution preferably contains at least about 80-90% of the above compounds. As a practical matter, however, diesters, triesters, unreacted material, etc., may be found in the solid solution. The solid solution is characterized, however, by the absence of a carrier.

Although compositions containing as little as about 40% of the mono-esters are somewhat effective, much better results are obtained with compositions containing higher concentrations of monoesters.

To produce the solid solution, the ingredients are preferably melt blended as described herein. Also, glycerine or propylene glycol may be esterified simultaneously with saturated and unsaturated acids (or, of course, the mixture of acids obtained from animal fat and/or vegetable oil) as described herein to obtain the solid solution. Surprisingly, a physical blending of the ingredients is ineffective in producing compositions in accordance with this invention.

The monoesters referred to herein are those prepared from glycerol or propylene glycol. Thus, the term "monoester" as used herein is restricted to esters of these polyhydric alcohols.

The fatty acid moiety generally comprises 8–22 carbon atoms and usually 14–20 carbon atoms. A saturated monoester is a fatty acid monoester, wherein the fatty acid moiety is chemically substantially saturated. A saturated monoester product is one consisting of at least one saturated monoester and having a total monoester concentration of at least about 40%, normally at least 60% by weight, and preferably at least about 90% by weight, and an iodine value [AOCS Official Method Cd 1-25 (rev. April, 1956), Official and Tentative Methods of the American Oil Chemists Society, 2nd ed., additions and revisions 1947 through 1963, inclusive] generally in a range from 0 to about 5 preferably less than about 1. An unsaturated monoester is a fatty acid monoester, wherein the fatty acid moiety is chemically unsaturated (at least only partially hydrogenated). An unsaturated monoester product is one consisting essentially of at least one unsaturated monoester and having a total monoester concentration of at least about 40%, normally at least 60% by weight, and preferably at least about 90% by weight, and an iodine value generally in a range from 5 to about 75. Thus, the term "monoester" as used herein refers to esters containing a major quantity of monoesters, but the esters may also contain some diesters, triesters, etc.

The monoester products of this invention are made in accordance with well-known procedures. One conventional procedure is the direct esterification of one or more fatty acids with glycerol or propylene glycol followed preferably by distillation to obtain a high purity product containing one or more monoester. Other procedures for the preparation of distilled, high purity monoglyceride products are disclosed in U.S. Pat. Nos. 2,634,234; 2,634,278 and 2,634,279, to Kuhrt. Such distilled monoesters products usually contain monoesters at a concentration of at least about 90% by weight.

A preferred saturated monoester is a distilled monoester product made from fully hydrogenated lard with an iodine value in a range from about 0.4 to about 1. Other preferred saturated monoester products include the distilled monoester products made from fats such as tallow, palm oil, cottonseed oil, soybean oil, peanut oil, sesame oil and the like, which have been fully hydrogenated, the distilled monoester products made from such saturated fatty acids as palmitic acid, stearic acid and the like, and blends of distilled monoester products. Commercially available saturated monoesters include Myverol 18-00, 18-04, 18-06 and 18-07 distilled monoglycerides, products of Eastman Chemical Products, Inc.

A preferred unsaturated monoester is a distilled monoester product made from lard. Other preferred unsaturated monoesters include the distilled monoester made from fats such as tallow, cottonseed oil, palm oil, soybean oil, peanut oil, corn oil, sesame seed oil and the like, the distilled monoester products made from such unsaturated fatty acids as oleic acid, linoleic acid and the like, and blends of these distilled monoesters. Commercially available unsaturated monoglycerides include Myverol 18-30, 18-35, 18-40, 18-50K, 18-85 and 18-98 distilled monoglycerides, products of Eastman Chemical Products, Inc.

Preservatives such as antioxidants (for example, propyl gallate, butylated hydroxy toluene, butylated hydroxy anisole and the like) and metal complexing agents (for example, glycine, phosphoric acid and the like) are preferably employed. Concentrations are conventional, generally being less than 1% by weight of the dispersion.

Succinylated monoglyceride which may be used in the solid solution is a half ester of succinic acid and of a mono-acylated polyhydric alcohol, or its salt. This compound or its salt may be represented by the following general formula:

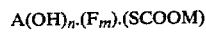

$$A(OH)_n \cdot (F_m) \cdot (SCOOM)$$

in which compound F is a residue of an even numbered, straight chain saturated fatty acid having from 14 to 24 carbon atoms; SCOO is the succinic acid residue or the salt thereof; A is a residue of a polyhydric alcohol having a straight chain length of from 2 to 6 carbon atoms; m is equal to 1; n is a number from zero to 4; and M is hydrogen, an edible alkali metal or alkaline earth.

Stearic acid is the preferred fatty acid residue in the succinylated monoglyceride, but myristic, palmitic and behenic acids provide satisfactory residues. The fatty acid residue should be substantially completely hydrogenated. Also, the preferred polyhydric alcohol residue is a glycerol residue, thus providing a free hydroxyl group on the glycerol residue. However, a propylene glycol residue provides a compound having no free hydroxyl group and which is a satisfactory compound. Sorbitol or sorbitan provide compounds having two or more free hydroxyl groups and are satisfactory.

Succinylated monoglyceride is a commercially available product, marketed by Eastman Chemical Products, Incorporated, under the trademark Myverol SMG Type V succinylated monoglyceride.

In the preparation of the succinyl half esters, succinic acid is preferably utilized in its anhydride form. The preparation of the compound of this invention is controlled to provide a low degree of polymerization and to maximize the half ester content of the succinyl half ester.

If the reactants utilized in the preparation of succinyl half esters are substantially pure and the preferred conditions for reaction are utilized then the resulting product will be predominantly succinyl half ester. On the other hand, if the reactants are not substantially pure and/or the preferred reaction conditions are not employed, then some byproducts are formed thereby providing a mixture.

In the preparation of the succinyl half esters, the monoacylated polyhydric alcohol can be prepared by esterification of the polyhydric alcohol, e.g., glycerol, with a fatty acid having an even chain length of from 14 to 24 carbon atoms, which is preferably stearic acid. In this connection, the fatty acid is reacted with the polyhydric alcohol under such conditions that the polyhydric alcohol is present in a substantial excess in order to assure provision of a preponderance of monoacylated compound.

It will be understood that various amounts of di-esters or tri-esters of the higher fatty acid and polyhydric alcohol may be present with the mono-esters. The presence of these polyester compounds does not provide compounds or derivatives which are functional to improve the overall baking properties. Since, in an equilibrium reaction, the esterification will provide about 60 percent mono-acylated ester and about 35 percent of the di-acylated ester, the reaction mixture desirably is molecularly or otherwise distilled to enrich the mixture in mono-acylated ester. The succinyl half ester is desirably prepared with a mono-acylated ester content of not less than about 50 percent and, preferably, the succinyl half esters are prepared with molecularly distilled mono-acylated ester wherein the mono-acylated ester is present at a level of at least about 90 percent.

The mono-acylated ester of the polyhydric alcohol is then preferably reacted with succinic anhydride, although succinic acid may be used, under suitable conditions. These reaction conditions are so controlled as to provide maximum amounts of the half ester of the acid, as distinguished from the full or neutral ester, and to minimize polymerization. This control is effected by measurement of the acid number and by termination of the reaction when the acid number is about one-half of the original acid number of the reactants. In this connection, each molecule of the succinic anhydride is reacted with one molecule of the mono-acylated polyhydric alcohol at one of its hydroxyl groups. If the reaction conditions are not suitably controlled, the free carboxyl groups on the half ester are reduced and the yield of the succinyl half ester is reduced.

The powder according to this invention may be prepared by melt blending the ingredients until a homogeneous mass is obtained and then forming a powder from the mass. Melt blending may be accomplished by individually maintaining or raising the temperatures of the compounds to a point above their respective melting temperatures so each is a molten mass and then thoroughly blending, or by mixing the ingredients at room temperature and then raising the temperature of the mixture at least to the melting point of the highest-to-melt ingredient followed by thoroughly blending to form a homogeneous mass. Preferably, melt blending is accomplished at a temperature of between about 80° C. and 120° C. Powdering may be accomplished by conventional means such as, for example, spray chilling, freezing and pulverizing, or by any other means known in the art. Laboratory experiments indicate that the quality of product produced on small scale by powdering in a blender using dry ice is quite satisfactory. Such powdering is accomplished by first heating a mixture of the selected ingredients until a molten or liquified mass is formed, and then rapidly stirring until the mass is homogenized. For example, 100 grams of molten mixture in a 250 ml. beaker may be stirred until the mixture is found to be homogeneous. The mixture may then be poured out and cooled until solidified, typically for about 3-4 hours at room temperature. The solid may then be powdered in a high speed stirring device such as a Waring Blendor using dry ice. The dry ice is subsequently evaporated and the powder residue sieved to an approximate size of 50-300 microns. The powder is white, free flowing, and is readily incorporated into a baking sponge or brew.

The powder produced as described above is found to be expecially useful in the production of bread. The powder is most conveniently added to the dough, but, of course, could be added to the sponge or brew if desired. The powder is preferably added in amounts of between about 3 oz. and about 12 oz. per 100 lbs. of flour.

The sponge-dough method of bread production involves the mixing of part of the ingredients to form a sponge which is then fermented for approximately four hours. The sponge is then mixed with the remaining ingredients until the desired gluten structure is obtained. After the second mixing period and a suitable rest period, the dough is divided for further processing. The sponge-dough method produces bread which has better volume and flavor than bread produced with the continuous-mix method while the latter method is notable in that it produces bread with very fine grain at a lower manufacturing cost.

| TYPICAL BREAD FORMULA - (SPONGE-DOUGH PROCESS) | |
|---|---|
| | Percent of Flour |
| Sponge: | |
| Flour | 65.0 |
| Water | 42.0 |
| Yeast | 2.0 |
| Yeast food | 0.5 |
| Mix time: 4.5 minutes. | |
| Ferment time: 4.5 hours at 86° F. and 80% humidity. | |
| Dough (includes the fermented sponge): | |
| Flour | 35.0 |
| Water | 27.0 |
| Sugar | 6.0 |
| Salt | 2.3 |
| Milk powder | 4.0 |
| Shortening | 3.0 |
| Dough conditioner, test level. | |
| Mix time: 9.5 minutes. | |
| Floor time: 30 minutes. | |
| Proof time: 1 hour at 106–108° F. and 95% humidity. | |
| Bake time: 20 minutes at 450° F. | |

| TYPICAL BREAD FORMULA - (CONTINUOUS MIX PROCESS) | | |
|---|---|---|
| Brew | Percent of Weight | Weight (Grams) |
| Water | 67.0 | 3484.0 |
| Sugar | 8.0 | 416.0 |
| Salt | 2.25 | 117.0 |
| Nonfat dry milk | 3.00 | 156.0 |
| Yeast food | 0.50 | 26.0 |
| Calcium phosphate (dibasic) | 0.10 | 5.2 |
| Calcium propionate | 0.10 | 5.2 |
| Yeast | 2.50 | 130.0 |
| Brew fermented for 2-½ hours at 86° F. | | |
| Dough or Premix | | |
| Flour | 100.0 | 5200.0 |
| Brew | — | 4235.0 |
| Shortening blend | 3.0 | 156.0 |
| Lard | | (148.0) |
| Flakes | | (8.0) |
| Standard oxidation solution | | 52.0 ml. |
| Emulsifier | | As needed |
| Flour, brew, shortening blend, and oxidation solution are mixed together in a Hobart Mixer for 45 seconds on low speed and 15 seconds on #2 speed. Premix is transferred to loading cylinder on Do-Maker. | | |
| Standard Oxidant Solution | | |
| Water (distilled) | | 1000 ml. |
| Iodate | | 1.250 gm. |

| TYPICAL BREAD FORMULA - (CONTINUOUS MIX PROCESS) | |
|---|---|
| Bromate | 5.000 gm. |

BREAD SOFTNESS TEST

Bread softness data are obtained with a Baker Compressimeter, available from Wallace & Tiernan of Belleville, N.J. Ten slices of bread are selected from one loaf and the amount of stress in grams required to exert a strain (or compression) of 3 mm. in a 1 cm. slice is determined. The "compressimeter value" is the arithmetical average of the ten slices of one loaf taken at the end of four days' storage. A lower mean compressimeter value indicates softer bread and a higher value indicates firmer bread.

Bread volume for each test batch is determined by conventional methods using a rapeseed displacement technique. Volume determinations are made immediately after baking. Bread volumes are statistical means of four loaves. Proofed doughs are dropped 6 inches against a solid surface. Bread is packaged in 1-mil. polyethylene bags and stored at 25° C.

The following examples are included for a better understanding of the invention.

In the examples appearing in the following table, the emulsifiers are used in approximately equal ratios by weight unless otherwise indicated. The mixtures are heated to 80° C. and stirred for several minutes. The molten mixture is then poured out and cooled for 24 hours. The resulting solid is then powdered in a Waring Blendor using dry ice. The dry ice evaporates and the powder is sieved to an approximate size of 150–300 microns and is ready to use as a softener. Bread is baked using the sponge-dough formula described above. Four Roses flour is a product of Southeastern Mills, Inc., Rome, Ga. Jasco flour is a product of White Lily Food Company, Knoxville, Tenn.

The legend for the tables is as follows:

a—Myvatex 25-07 food emulsifier, a blend of distilled monoglycerides, lecithin, and water; parent fat is hydrogenated vegetable oil, a product of Eastman Chemical products, Inc.

b—Myvatex 25-00 food emulsifier, a blend of distilled monoglycerides, lecithin, and water; parent fat is hydrogenated lard, a product of Eastman Chemical Products, Inc.

c—Myverol 18-04 distilled monoglyceride, prepared from fully hydrogenated palm oil, a product of Eastman Chemical Products, Inc.

d—Myverol 18-35 distilled monoglyceride, prepared from partially hydrogenated refined palm oil (unsaturated), a product of Eastman Chemical Products, Inc.

e—Myverol 18-30 distilled monoglyceride, prepared from edible tallow (unsaturated), a product of Eastman Chemical Products, Inc.

f—Myverol 18-00 distilled monoglyceride, prepared from fully hydrogenated animal fat, a product of Eastman Chemical Products, Inc.

g—Myverol SMG Type V succinylated monoglyceride, prepared from fully hydrogenated vegetable oil, a product of Eastman Chemical Products, Inc.

h—Myverol 18-06 distilled monoglyceride, prepared from fully hydrogenated soybean oil, a product of Eastman Chemical Products, Inc.

i—Myverol 18-50 distilled monoglyceride, prepared from partially hydrogenated soybean oil, a product of Eastman Chemical Products, Inc.
j—Myverol 18-85 distilled monoglyceride, prepared from partially hydrogenated cottonseed oil, a product of Eastman Chemical Products, Inc.
suc—succinylated.

The following table illustrates typical examples of monoglycerides (see legend above) and their properties. Unless otherwise specified, the blends are on a 1:1 ratio.

BREAD PROPERTIES

| Example | Emulsifier | Melting Point, °C. | Level | Added To | Undropped Volume | Dropped Volume | Softness Day |
|---|---|---|---|---|---|---|---|
| 1 | None | — | Four Roses Flour | — | 2256 | 1719 | 11.25$^{4th}$ |
| 2 | a | — | 16 oz. | Sponge | 2431 | 1988 | 10.3$^{4th}$ |
| 3 | c/d | 66 | 4 oz. | Sponge | 2356 | 2044 | 10.4$^{4th}$ |
| 4 | c/d | 66 | 4 oz. | Sponge | 2394 | 1956 | 10.0$^{5th}$ |
| 5 | None | — | Jasco | — | 2086 | 1844 | 13$^{4th}$ |
| 6 | b | — | 32 oz. | Dough | 2463 | 2139 | 7.6$^{5th}$ |
| 7 | c/d | 66 | 4 oz | Sponge | 2331 | 2094 | 10.4$^{5th}$ |
| 8 | c/d | 66 | 8 oz. | Sponge | 2461 | 2119 | 8.9$^{6th}$ |
| 9 | None | — | Four Roses Flour | — | 2106 | 1969 | 16.3$^{4th}$ |
| 10 | c/d | 66 | 8 oz. | Dough | 2444 | 2056 | 8.6$^{4th}$ |
| 11 | c/d | 66 | 8 oz. | Sponge | 2286 | 2050 | 9.0$^{5th}$ |
| 12 | c/d | 66 | 8 oz. | Sponge | 2394 | 2069 | 7.9$^{4th}$ |
| 13 | c/d | 66 | 8 oz. | Dough | 2362 | 2125 | 7.7$^{4th}$ |
| 14 | a | — | 23 oz. | Dough | 2369 | 1988 | 8.9$^{4th}$ |
| 15 | c/d | — | 5.8 oz. | Dough | 2331 | 2012 | 9.5$^{4th}$ |
| 16 | c/d | 66 | 5.8 oz. | Dough | 2469 | 2156 | 9.2$^{4th}$ |
| 17 | c/d-2:1 | 68.5 | 5.8 oz. | Dough | 2456 | 2181 | 9.1$^{4th}$ |
| 18 | c/d-3:1 | 69 | 5.8 oz. | Dough | 2519 | 1256 | 9.0$^{4th}$ |
| 19 | None | — | Jasco Flour | — | 2086 | 1844 | 13$^{4th}$ |
| 20 | g/c/e | 55 | 4 oz. | Sponge | 2450 | 2126 | 10.9$^{6th}$ |
| 21 | g/f/e | 55 | 4 oz. | Sponge | 2518 | 2300 | 10.0$^{5th}$ |
| 22 | None | — | Four Roses Flour | — | 2106 | 1969 | 16.3$^{4th}$ |
| 23 | g/f/e | 55 | 4 oz. | Sponge | 2506 | 2250 | 7.9$^{4th}$ |
| 24 | g/f/e | 55 | 6 oz. | Sponge | 2400 | 2250 | 8.3$^{4th}$ |
| 25 | g/f/e | 55 | 6 oz. | Dough | 2581 | 2206 | 9.4$^{5th}$ |
| 26 | g/c/d | 59 | 6 oz. | Dough | 2587 | 2319 | 8.0$^{4th}$ |

| Example | Conditioner | Iodine Value | Melting Point, °C. | Wettability Value (Angle in Degrees) |
|---|---|---|---|---|
| 27 | c/d | 21.0 | 63–65 | 30 |
| 28 | g/f/e | 11.0 | | |
| 29 | g/c/d | 11.0 | 64 | |
| 30 | h(suc)/i/h | 5.8 | 59 | |
| 31 | d (Control) | 40.0 | 54 | 39 |
| 32 | h/j - 9:1 | 10.8 | 71 | |
| 33 | h/l-9:1 | 7.5 | | |
| 34 | c(suc)/c/d | 6.3 | 59 | 54 |
| 35 | h (Control) | 2.0 | 73.5 | 87 |
| 36 | c(suc) (Control) | 2.0 | 64 | |
| 37 | h(suc) (Control) | 2.0 | 77 | 63 |
| 38 | h(suc)/h (Control) | 2.0 | 62 | 45 |
| 39 | c (Control) | 2.0 | 67 | 94 |
| 40 | h (Control) | 2.0 | 70.5 | 87 |
| 41 | h(suc) (Control) | 2.0 | 70.5 | 87 |
| 42 | h/i | 31.0 | 65 | 35 |
| 43 | h(suc)/i | 31.0 | | 62 |
| 44 | h(suc)/i/h | 21.0 | 65 | 38 |
| 45 | h(suc)/i/h -4:1:4 | 11.0 | | 40 |
| 46 | h(suc)/i/h -:4:1 (Control) | 41.0 | | 38 |
| 47 | h(suc)/ih - 1:1:4 | 11.0 | | 69 |
| 48 | h(suc)/h (Control) | 2.0 | 62 | 45 |
| 49 | c/d - 2:1 | 15.0 | 66 | 32 |
| 50 | c/d -3:1 | 10.0 | 69 | 40 |
| 51 | c(suc)/c/d- 2:2:1 | 7.0 | 59 | 54 |
| 52 | c(suc)/c/d - 18:9:1 | 6.0 | 52 | 42 |
| 53 | i (Control) | 60.0 | 49 | 28 |

The iodine values specified herein are measured in accordance with AOCS Official Method Cd 1-25 (rev. April 1956), Official and Tentative Methods of the American Oil Chemists Society, 2nd ed., additions and revisions 1947 through 1963, inclusive.

Melting points herein are determined in accordance with AOCS Official Method Melting Point Capillary Tube Method Cc 1-25.

Wettability values specified herein are angles designated in degrees, measured by a Kernco Contact Angle Meter. This test in conducted as follows. Samples to be tested are cast in a 1 inch diameter, cylindrical hole in a metal plate. The molten test material is supported from the bottom by a solid plate. The test material is sandwiched by placing a third metal plate on top. All three plates are 1/16 inch thick, and have smooth, unfinished flat surfaces. This procedure provides similar matte surfaces for the samples. The samples are allowed to solidify, and while at room temperature, a drop of water is placed on each sample. After two minutes, the drop is substantially stable. Viewing the drop on the sample in elevation, a tangent to the edge of the drop where it meets the surface of the sample is formed by one of the crosshairs in the contact angle measuring device. The angle of this line relative to the line formed by the base of the drop (i.e., the angle of contact) is measured; wettability is inversely proportional to the numerical value of the angle. For example, if the sample is very wettable, the drop spreads and the angle is small. On samples having extremely poor wettability, this angle may be more than 90°. The angle is related to the surface tension of the sample, the surface tension of the water (or other liquid) and the surface tension of the solid-liquid interface according to the following formula:

$$1+\cos A = (B-C/D)$$

where A is the angle measured, B is the surface tension of the solid, C is the surface tension of the solid-liquid interface and D is the surface tension of the liquid. Wettability values specified herein are averages of six measurements.

While we do not wish to be bound in theory as to the principal of operation, we believe the unsaturated portion of the powder attracts water to the surface of the particles and subsequently forms micro gels. Thus, dry, free-flowing powder according to this invention is dispersible in water and bakery dough.

Unless otherwise specified, all percentages, ratios, parts, etc., are by weight.

By the term solid solution, we mean a homogeneous crystalline material containing two or more substances in variable proportion.

The invention has been described in detail with particular reference to certain preferred embodiments thereof, but it will be understood that variations and modifications can be effected within the spirit and scope of the invention.

We claim:

1. A free-flowing wettable powder, substantially all of the particles of which consist essentially of esters of fatty acids in solid solution, said esters consisting essentially of
   (a) from about 25% to about 75% by weight of at least one saturated ester of the formula

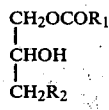

wherein $R_1$ is the residue of an (even numbered) straight chain saturated fatty acid having from 8 to 22 carbon atoms and $R_2$ is OH or H,
   (b) from about 10% to about 75% by weight of at least one unsaturated ester of the formula

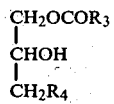

wherein $R_3$ is the residue of an (even numbered) straight chain unsaturated fatty acid having from 8 to 22 carbon atoms and $R_4$ is OH or H, and
   (c) from 0 to about 65% by weight of a succinylated monoglyceride of the formula

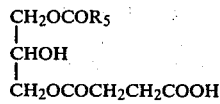

wherein $R_5$ is the residue of an even numbered straight chain saturated fatty acid having from 8 to 22 carbon atoms,
   said esters being at least 40% monoesters and having an iodine value of from about 5 to about 33.

2. A water dispersible powder according to claim 1 wherein said saturated monoglyceride is present in the amount of between about 40 and about 60%, and said unsaturated monoglyceride is present in the amount of between about 40 and about 60%.

3. A free-flowing wettable powder, substantially all of the particles of which consist essentially of esters of fatty acids in solid solution, said esters consisting essentially of
   (a) from about 25% to about 65% by weight of at least one saturated ester of the formula

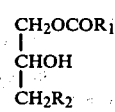

wherein $R_1$ is the residue of an (even numbered) straight chain saturated fatty acid having from 8 to 22 carbon atoms and $R_2$ is OH or H, and
   (b) from about 75% to about 35% by weight of at least one unsaturated ester of the formula

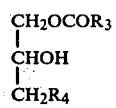

wherein $R_3$ is the residue of an (even numbered) straight chain unsaturated fatty acid having from 8 to 22 carbon atoms and $R_4$ is OH or H,
   said esters being at least 40 % monoester and having an iodine value of from about 5 to about 33.

4. A free-flowing wettable powder, substantially all of the particles of which consist essentially of esters of fatty acids in solid solution, said esters consisting essentially of
   (a) from about 35% to about 75% by weight of at least one saturated monoester of the formula

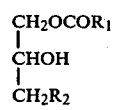

wherein $R_1$ is the residue of an (even numbered) straight chain saturated fatty acid having from 8 to 22 carbon atoms and $R_2$ is OH or H,
   (b) from about 10% to about 65% by weight of at least one unsaturated monoester of the formula

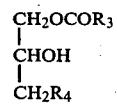

wherein $R_3$ is the residue of an (even numbered) straight chain unsaturated fatty acid having from 8 to 22 carbon atoms and $R_4$ is OH or H, and
   (c) from about 10% to about 40% by weight of a succinylated monoglyceride of the formula

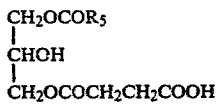

wherein R$_5$ is the residue of an even numbered straight chain saturated fatty acid having from 8 to 22 carbon atoms
said esters having an iodine value of from about 5 to about 33.

5. A water dispersible powder according to claim 4 wherein said unsaturated ester is present in the amount of between about 40 and about 60% by weight, said unsaturated ester is present in the amount of between about 15 and about 35% by weight, said succinylated monoglyceride is present in the amount of between about 15 and about 35% by weight.

6. A bread dough comprising the water dispersible powder defined in claim 1.

7. A bread dough comprising the water dispersible powder defined in claim 3.

8. A conditioner for bakery products consisting essentially of esters, or combinations of esters and partially succinylated esters, of glycerine, propylene glycol or combinations thereof and fatty acids having 8 to 22 carbon atoms, characterized in that said conditioner is in the form of a free flowing, homogeneous powder, has a melting point of about 50° C. or more, an iodine value of about 10 to about 33 and is wettable in water at 25° C. under mild agitation to form a particulate dispersion.

9. A conditioner according to claim 8 wherein the wettability value is between 0 and about 65.

10. A conditioner according to claim 8 wherein the wettability value is between 0 and about 50.

11. A conditioner for bakery products consisting essentially of esters, or combinations of esters and partially succinylated esters, of glycerine and fatty acids having 8 to 22 carbon atoms, characterized in that said conditioner is in the form of a free flowing, homogeneous powder, has a melting point of about 50° C. or more, an iodine value of about 5 to about 33 and is wettable in water at 25° C. under mild agitation to form a particulate dispersion.

12. A conditioner for bakery products consisting essentially of esters, or combinations of esters and partially succinylated esters, of propylene glycol and fatty acids having 8 to 22 carbon atoms, characterized in that said conditioner is in the form of a free flowing, homogeneous powder, has a melting point of about 50° C. or more, an iodine value of about 10 to about 33 and is wettable in water at 25° C. under mild agitation to form a particulate dispersion.

13. A dough product comprising from about 3 to about 12 ounces per 100 pounds of flour of the conditioner according to claim 8.

14. A dough product comprising from about 3 to about 12 ounces per 100 pounds of flour of the conditioner according to claim 12.

15. Process for preparing a conditioner for bakery products comprising
(a) melt blending a mixture consisting essentially of at least two esters of glycerine, propylene glycol or combinations thereof and fatty acids having 8 to 22 carbon atoms to form a homogeneous mixture having an iodine value of from about 10 to about 33, and
(b) spray-drying said homogeneous mixture to form a free flowing powder having a melting point of about 50° C. or more which is wettable in water at 25° C. under mild agitation to form a particulate dispersion.

16. Process for preparing a conditioner for bakery products comprising
(a) melt blending a mixture consisting essentially of at least two esters of glycerine, propylene glycol or combinations thereof and fatty acids having 8 to 22 carbon atoms to form a homogeneous mixture having an iodine value of from about 10 to about 33, and
(b) spray-drying said homogeneous mixture to form a free flowing powder having a melting point of about 50° C. or more which has a wettability value of from 0 to about 65.

* * * * *